United States Patent Office 3,437,459

Patented Apr. 8, 1969

3,437,459

COMPOSITE SUPERCONDUCTOR HAVING A CORE OF SUPERCONDUCTIVITY METAL WITH A NONSUPERCONDUCTIVE COAT

John Eric Charles Watts Williams, Wallingford, England, assignor to United Kingdom Atomic Energy Authority, London, England

No Drawing. Continuation of application Ser. No. 306,346, Sept. 3, 1963. This application Mar. 27, 1967, Ser. No. 626,338

Claims priority, application Great Britain, Sept. 7, 1962, 34,437/62

Int. Cl. H01v *11/08, 11/12*

U.S. Cl. 29—183.5 1 Claim

ABSTRACT OF THE DISCLOSURE

A composite superconductor wire comprising a multiplicity of filamentary conductors of a superconducting material mounted in a non-superconducting carrier is capable of handling a very high current density in a magnetic field in excess of the critical field of the superconductive material. The composite wire is produced from a billet of carrier material containing inclusions of the superconductor material which is drawn down so that filamentary conductors of the appropriate size are produced. The superconductive enclosed element, taken from the group of vanadium, lead, niobium and an alloy niobium and zirconium, is made so small that it remains superconductive even in a field that exceeds the critical field strength for the material.

This application is a continuation of application Ser. No. 306,346, filed Sept. 3, 1963, now abandoned.

This invention relates to superconducting wire and methods of making such wire.

The theory of superconductivity predicts that fine filaments of superconducting material (less than about 0.1 micron in diameter) should be capable of carrying a high current density (up to $2.10^8$ amps per square cm.) in magnetic field strengths appreciably in excess of the thermodynamic critical field. However, the difficulties of drawing and handling such filaments has hitherto prevented the practical realisation of the theory.

According to the present invention a superconducting wire comprises a carrier and at least one inclusion, each inclusion being a continuous filament of superconducting material of small enough diameter to exhibit superconductivity in a magnetic field of a strength in excess of the thermodynamic critical field and the carrier being of a material and of a diameter capable of being drawn by wire drawing techniques.

The inclusions may be elemental in which case they are preferably of niobium, although other superconducting materials such as vanadium or lead may be used. Alternatively the inclusions may be alloyed, for example they may be an alloy of niobium and zirconium. The carrier material should be compatible with the filament material, and if the wire is to be annealed at any stage there must not be significant diffusion of the inclusion into the carrier or vice versa.

The carrier material is not necessarily electrically conducting, but it is preferably non-magnetic and it must not be superconducting at the temperature the wire is to be used. It is preferable for the carrier to be an inhibitor of superconductivity and a preferred material is molybdenum.

Two methods of making superconducting wires in accordance with the present invention will now be described by way of example.

In the first method a cylindrical billet of molybdenum about 4 inches in diameter is formed with say 100 equally spaced axial holes which are plugged with rods of niobium. The diameter of each rod is 0.04 inch, and they may simply be inserted in drilled holes in the billet. The composite billet is then reduced in diameter by swaging and/or drawing down to about 0.0005 inch, so that the inclusions are then filaments having a diameter of about 0.000005 inch.

The process may be continued by cutting the wire into lengths, laying the lengths parallel to make a bundle, which may then be sheathed by extruding molybdenum over it, and swaging and/or drawing the bundle to reduce the diameter further. This step may be repeated a number of times until, say, the resulting wire is 0.02 inch in diameter and has $10^8$ inclusions.

In the second method a bundle is first made up from a large number of niobium wires which have been electroplated with molybdenum. A sheath of molybdenum is extruded over the bundle, and the whole then reduced in diameter as described above.

Although only niobium and molybdenum have been referred to in the particular examples, other materials may be satisfactorily used subject to the limitations mentioned above. The best results are however obtained where the carrier material is an inhibitor of superconductivity, as is impure molybdenum or is an insulator. This is because if the carrier material is merely not superconducting, as for example copper, there is a tendency when a very fine composite wire has been made for the carrier material in the immediate region of an inclusion to show superconducting properties. This has the effect of making the effective diameters of the filaments greater than their actual diameters, so reducing the maximum magnetic field strength in which the composite wire will have superconducting properties.

I claim:

1. A composite superconductive wire comprising a multiplicity of filamentary conductors of a superconductor from the group consisting of vanadium, lead, niobium and an alloy of niobium and zirconium, each of said filamentary conductors being of a diameter less than 0.000005 inch, a ductile non-superconducting layer of molybdenum surrounding each filamentary conductor and a common outer sheath of a ductile non-superconductive material.

References Cited

UNITED STATES PATENTS

| | | | |
|---|---|---|---|
| 2,665,475 | 1/1954 | Campbell | 29—198 X |
| 2,866,842 | 12/1958 | Mathias | 148 |
| 3,109,963 | 5/1963 | Geballe | 317—158.1 X |
| 3,124,455 | 3/1964 | Buehler | 148 |
| 3,218,693 | 11/1965 | Allen | 29—194 X |

OTHER REFERENCES

"Superconductivity in High Magnetic Fields at High Current Densities," by Kunzler, Review of Modern Physics, vol. 33, No. 4, October 1961, pp. 501—509.

HYLAND BIZOT, *Primary Examiner.*

U.S. Cl. X.R.

29—194, 195, 198